(12) United States Patent
Lilja et al.

(10) Patent No.: US 11,719,799 B2
(45) Date of Patent: Aug. 8, 2023

(54) METHOD FOR DETERMINING A COLLISION FREE SPACE

(71) Applicant: Aptiv Technologies Limited, St. Michael (BB)

(72) Inventors: Adam Mats John Lilja, Gothenburg (SE); Markus Pär Oscar Carlander, Hisings-Kärra Gothenburg (SE)

(73) Assignee: Aptiv Technologies Limited, St. Michael (BB)

( * ) Notice: Subject to any disclaimer, the term of this patent is extended or adjusted under 35 U.S.C. 154(b) by 307 days.

(21) Appl. No.: 17/199,358

(22) Filed: Mar. 11, 2021

(65) Prior Publication Data
US 2021/0333380 A1  Oct. 28, 2021

(30) Foreign Application Priority Data
Apr. 27, 2020 (EP) .................................... 20171489

(51) Int. Cl.
*G01S 13/04* (2006.01)
*G01S 13/931* (2020.01)

(52) U.S. Cl.
CPC ............ *G01S 13/04* (2013.01); *G01S 13/931* (2013.01); *G01S 2013/93271* (2020.01)

(58) Field of Classification Search
CPC ..... G06V 20/588; G01S 17/931; G01S 17/89; G01S 17/86; G01S 13/931;
(Continued)

(56) References Cited

U.S. PATENT DOCUMENTS 7,124,027 B1 * 10/2006 Ernst, Jr. ............... B60W 30/09
701/301
7,639,171 B2  12/2009 Alland et al.
(Continued)

FOREIGN PATENT DOCUMENTS

CN   103559791   2/2014
CN   111401208   7/2020
(Continued)

OTHER PUBLICATIONS

"Extended European Search Report", EP Application No. 21157127.8, dated Jul. 9, 2021, 10 pages.
(Continued)

*Primary Examiner* — Vladimir Magloire
*Assistant Examiner* — Michael W Justice
(74) *Attorney, Agent, or Firm* — Sawtooth Patent Group PLLC (57) ABSTRACT

A computer implemented method is provided for determining a collision free space in front of a host vehicle. A plurality of limiting points is detected via a detection system of the host vehicle, wherein each limiting point is located at a respective obstacle free distance with respect to the vehicle. A dynamic grid is formed in front of the host vehicle, wherein the dynamic grid is based on the course of a lane being determined in front of the host vehicle via the detection system of the host vehicle, and wherein the dynamic grid comprises a plurality of cells. An obstacle free subset of the cells is determined based on the plurality of limiting points, wherein the obstacle free subset of the cells defines the collision free space in front of a host vehicle.

20 Claims, 5 Drawing Sheets

(58) Field of Classification Search
CPC .... G01S 13/93271; G01S 13/89; G01S 13/86; G01S 13/865; G01S 13/867
USPC .......................................................... 342/27
See application file for complete search history.

(56) References Cited

U.S. PATENT DOCUMENTS

| | | | |
|---|---|---|---|
| 8,930,060 B1* | 1/2015 | Lu | B60K 28/14 701/25 |
| 9,199,668 B2* | 12/2015 | Zeng | G01S 13/931 |
| 9,470,777 B2 | 10/2016 | Arage | |
| 9,738,278 B2* | 8/2017 | Hasberg | G06V 20/58 |
| 10,303,178 B1* | 5/2019 | Gutmann | B60W 30/09 |
| 10,303,492 B1 | 5/2019 | Wagner et al. | |
| 10,430,641 B2 | 10/2019 | Gao | |
| 10,564,647 B2* | 2/2020 | Balaghiasefi | G08G 1/163 |
| 10,885,353 B2* | 1/2021 | Watanabe | G06T 7/77 |
| 10,909,411 B2* | 2/2021 | Sano | G06V 20/58 |
| 11,016,492 B2* | 5/2021 | Gier | G06V 20/58 |
| 11,073,832 B1* | 7/2021 | Gutmann | B60W 30/08 |
| 11,132,611 B2* | 9/2021 | Sano | G06N 7/01 |
| 11,195,028 B2* | 12/2021 | Lee | G06V 10/60 |
| 11,222,438 B2* | 1/2022 | Sano | G05D 1/0257 |
| 11,250,288 B2* | 2/2022 | Sano | G05D 1/0253 |
| 11,276,189 B2* | 3/2022 | Niesen | G06N 3/08 |
| 11,353,577 B2* | 6/2022 | Liu | G01S 13/867 |
| 11,393,097 B2* | 7/2022 | Brunner | G06T 7/20 |
| 11,475,678 B2* | 10/2022 | Myeong | G06V 20/588 |
| 11,530,921 B2* | 12/2022 | Nimmagadda | G08G 5/0021 |
| 11,544,940 B2* | 1/2023 | Baik | G06N 3/02 |
| 11,555,927 B2* | 1/2023 | Huang | G05D 1/024 |
| 2007/0005306 A1* | 1/2007 | Foessel | G01S 13/723 702/189 |
| 2009/0143951 A1* | 6/2009 | Takahashi | B60W 30/09 701/70 |
| 2012/0053755 A1* | 3/2012 | Takagi | G01S 7/4808 701/1 |
| 2015/0012204 A1 | 1/2015 | Breuer et al. | |
| 2015/0353062 A1 | 12/2015 | Breuer et al. | |
| 2015/0353083 A1* | 12/2015 | Hasberg | G05D 1/0274 701/1 |
| 2016/0116916 A1* | 4/2016 | Pink | G01S 13/89 701/23 |
| 2017/0083021 A1* | 3/2017 | Balaghiasefi | G05D 1/0274 |
| 2017/0344844 A1* | 11/2017 | Sano | G06F 18/256 |
| 2017/0344888 A1* | 11/2017 | Sano | G06N 5/04 |
| 2017/0345182 A1* | 11/2017 | Sano | B60K 35/00 |
| 2018/0074507 A1 | 3/2018 | Gao et al. | |
| 2018/0188059 A1 | 7/2018 | Wheeler et al. | |
| 2018/0189599 A1* | 7/2018 | Sano | G08G 1/165 |
| 2018/0239969 A1 | 8/2018 | Lakehal-ayat et al. | |
| 2018/0329034 A1 | 11/2018 | Bilik et al. | |
| 2018/0350086 A1 | 12/2018 | Sweet et al. | |
| 2019/0050649 A1* | 2/2019 | Watanabe | G08G 1/165 |
| 2019/0271549 A1 | 9/2019 | Zhang et al. | |
| 2019/0286153 A1* | 9/2019 | Rankawat | G05D 1/0246 |
| 2019/0318176 A1* | 10/2019 | Sano | G06V 20/58 |
| 2019/0340775 A1 | 11/2019 | Lee et al. | |
| 2019/0346854 A1* | 11/2019 | Slutsky | G01S 13/931 |
| 2019/0384302 A1* | 12/2019 | Silva | G06T 7/10 |
| 2020/0103523 A1* | 4/2020 | Liu | G01S 13/865 |
| 2020/0139959 A1 | 5/2020 | Akella et al. | |
| 2020/0183011 A1* | 6/2020 | Lin | G01S 17/89 |
| 2020/0217950 A1* | 7/2020 | Unnikrishnan | G01S 13/931 |
| 2020/0218907 A1* | 7/2020 | Baik | G06F 17/16 |
| 2020/0218908 A1* | 7/2020 | Lee | G06V 10/82 |
| 2020/0218909 A1* | 7/2020 | Myeong | G06V 20/588 |
| 2020/0218913 A1* | 7/2020 | Unnikrishnan | G01S 13/867 |
| 2020/0219264 A1* | 7/2020 | Brunner | G01S 7/4808 |
| 2020/0240795 A1* | 7/2020 | Nomura | G01C 21/3819 |
| 2020/0249356 A1* | 8/2020 | Huang | G05D 1/0231 |
| 2020/0250485 A1 | 8/2020 | Nagori et al. | |
| 2020/0334544 A1 | 10/2020 | Liu et al. | |
| 2020/0356415 A1 | 11/2020 | Goli | |
| 2020/0361489 A1* | 11/2020 | Park | B60W 50/0097 |
| 2020/0378766 A1 | 12/2020 | Omari et al. | |
| 2020/0391729 A1* | 12/2020 | Liu | B60W 30/0953 |
| 2021/0101624 A1* | 4/2021 | Philbin | G06V 10/764 |
| 2021/0131823 A1 | 5/2021 | Giorgio et al. | |
| 2021/0181750 A1* | 6/2021 | Gogna | G08G 1/096811 |
| 2021/0188286 A1 | 6/2021 | Ma et al. | |
| 2021/0278853 A1* | 9/2021 | Gier | G05D 1/0214 |
| 2021/0291816 A1 | 9/2021 | Lilja et al. | |
| 2021/0300353 A1 | 9/2021 | Carlander et al. | |
| 2021/0331679 A1 | 10/2021 | Lilja et al. | |
| 2021/0333380 A1 | 10/2021 | Lilja et al. | |
| 2021/0394761 A1* | 12/2021 | Steyer | G01S 7/497 |
| 2022/0057232 A1* | 2/2022 | Shen | G01S 17/89 |
| 2022/0180537 A1* | 6/2022 | Niesen | G01S 17/89 |
| 2022/0373353 A1 | 11/2022 | Ding | |

FOREIGN PATENT DOCUMENTS

| | | |
|---|---|---|
| DE | 102009009047 | 8/2010 |
| DE | 102009022588 | 12/2010 |
| DE | 102016007630 | 12/2017 |
| DE | 102017217972 | 4/2019 |
| DE | 102017126388 | 5/2019 |
| DE | 102019205008 | 7/2020 |
| EP | 3454079 | 3/2019 |
| JP | 2018138402 | 9/2018 |
| WO | 2020140047 | 7/2020 |

OTHER PUBLICATIONS

Joubert, et al., "Pose Uncertainty in Occupancy Grids through Monte Carlo Integration", Aug. 17, 2014, 6 pages.
Jungnickel, et al., "Efficient Automotive Grid Maps using a Sensor Ray based Refinement Process", Jul. 9, 2021, 8 pages.
"Extended European Search Report", EP Application No. 20164443.2, dated Sep. 9, 2020, 10 pages.
"Extended European Search Report", EP Application No. 20171489.6, dated Sep. 18, 2020, 11 pages.
"Extended European Search Report", EP Application No. 20171491.2, dated Sep. 28, 2020, 9 pages.
"Extended European Search Report", EP Application No. 20166617.9, dated Oct. 7, 2020, 7 pages.
Casapietra, et al., "Building a Probabilistic Grid-based Road Representation from Direct and Indirect Visual Cues", Jun. 2015, 8 pages.
Kunz, et al., "Fast Collision Checking with a Frenet Obstacle Grid for Motion Planning", Jun. 2014, pp. 95-104.
Nuss, "Consistent Environmental Modeling by use of Occupancy Grid Maps, Digital Road Maps, and Multi-Object Tracking", Jun. 2014, 7 pages.
Sundram, et al., "Development of a Miniature Robot for Multi-robot Occupancy Grid Mapping", Jul. 2018.
Weiss, "Robust Driving Path Detection in Urban and Highway Scenarios Using a Laser Scanner and Online Occupancy Grids", Jul. 2007, pp. 184-189.
"Extended European Search Report", EP Application No. 20209230.0, dated May 4, 2021, 10 pages.
"Extended European Search Report", EP Application No. 20211232.2, dated May 25, 2021, 10 pages.
"Extended European Search Report", EP Application No. 20214293.1, dated May 27, 2021, 10 pages.
Aihara, et al., "Free-Space Estimation for Self-Driving System Using Millimeter Wave Radar and Convolutional Neural Network", Mar. 2019, 4 pages.
Bochkovskiy, et al., "YOLOv4: Optimal Speed and Accuracy of Object Detection", Apr. 23, 2020, 17 pages.
Caltagirone, et al., "LIDAR-Camera Fusion for Road Detection Using Fully Convolutional Neural Networks", Sep. 21, 2018, 7 pages.
Chen, et al., "Progressive LiDAR Adaptation for Road Detection", Apr. 2, 2019, 11 pages.
Foroughi, et al., "Free Space Grid for Automotive Radar Sensors", Sep. 2015, pp. 249-256.

(56) References Cited

OTHER PUBLICATIONS

Godard, et al., "Digging Into Self-Supervised Monocular Depth Estimation", Aug. 17, 2019, 18 pages.
Guizilini, et al., "3D Packing for Self-Supervised Monocular Depth Estimation", Mar. 28, 2020, 13 pages.
Li, et al., "High Resolution Radar-based Occupancy Grid Mapping and Free Space Detection", Mar. 2018, pp. 70-81.
Liang, et al., "PolyTransform: Deep Polygon Transformer for Instance Segmentation", Jan. 16, 2021, 10 pages.
Lyu, et al., "ChipNet: Real-Time LiDAR Processing for Drivable Region Segmentation on an FPGA", Mar. 5, 2019, 11 pages.
Maneewongvatana, et al., "It's okay to be skinny, if your friends are fat", Dec. 18, 1999, 8 pages.
Redmon, et al., "YOLO9000: Better, Faster, Stronger", Jul. 2017, 9 pages.
Redmon, "YOLOv3: An Incremental Improvement", Apr. 8, 2018, 6 pages.
Redmon, et al., "You Only Look Once: Unified, Real-Time Object Detection", May 9, 2016, 10 pages.
Suzuki, et al., "Topological Structural Analysis of Digitized Binary Images by Border Following", Apr. 1985, pp. 32-46.
Zhao, et al., "Pyramid Scene Parsing Network", Apr. 27, 2017, 11 pages.
Zou, "Free Space Detection Based on Occupancy Gridmaps", Apr. 2012, 70 pages.

\* cited by examiner

METHOD FOR DETERMINING A COLLISION FREE SPACE

CROSS-REFERENCE TO RELATED APPLICATION

This application claims priority to European Patent Application Number 20171489.6, filed Apr. 27, 2020, the disclosure of which is hereby incorporated by reference in its entirety herein.

BACKGROUND

The present disclosure relates to a method for determining a collision free space in front of a host vehicle.

Advanced driver assistance systems (ADAS) have been developed to support drivers in order to drive a host vehicle more safely and comfortably. In order to perform properly and due to safety reasons, the environment in front of a host vehicle needs to be monitored e.g. in order to determine a collision free space in a lane in front of the host vehicle.

In order to determine such a collision free space in front of the host vehicle, a set of points is usually detected, e.g. by a vision system of the host vehicle, wherein each of these points represents a distance with respect to the host vehicle which is regarded as free of any obstacle. Each of the set of points is detected for a different angle with respect to the host vehicle. The detected points are connected with straight lines in order to provide a polygon, and the interior of this polygon provides the collision free space.

The set of points, however, is usually represented by polar coordinates, i.e. by a range and an angle, both of which are defined with respect to a coordinate system of the host vehicle. The polygon defining the collision free space is therefore represented in polar coordinates as well and contains information about the boundary of the collision free space only.

However, some applications used by the host vehicle require so-called grid-based information, e.g. applications which are part of the advanced driver assistance systems. In detail, a discrete grid comprising many cells has to be defined for these applications, and for each cell it has to be known if it is free of any obstacle. Since the polygon defining the collision free space is represented by polar coordinates in a "continuous domain", some transformations of the polygon are required in order to provide the necessary information for the specific application requiring a grid based representation. Therefore, the computational effort for the specific application is increased.

Accordingly, there is a need to have an improved method which provides a grid-based representation for a collision free space in front of a host vehicle.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for determining a collision free space in front of a host vehicle. According to the method, a plurality of limiting points is detected via a detection system of the host vehicle, wherein each limiting point is located at a respective obstacle free distance with respect to the vehicle. A dynamic grid is formed in front of the host vehicle via the detection system and via a computer system of the host vehicle, wherein the dynamic grid is based on the course of a lane being determined in front of the host vehicle via the detection system of the host vehicle, and wherein the dynamic grid comprises a plurality of cells. An obstacle free subset of the cells is determined based on the plurality of limiting points via the computer system, wherein the obstacle free subset of the cells defines the collision free space in front of a host vehicle.

It is noted that the plurality of limiting points and the dynamic grid comprising the plurality of cells are defined in a plane which is parallel to the part of the lane on which the host vehicle is momentarily located. In other words, when the host vehicle is viewed from above, all limiting points and all cells of the dynamic grid are disposed within the same horizontal plane with respect to the lane.

As used herein, a computer system may include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The computer system may further include memory (shared, dedicated, or group) that stores code executed by the processor.

According to the method, the information regarding the collision free space which is provided by detecting the limiting points is transferred to the dynamic grid which is formed in front of the host vehicle by the detection system and by the computer system of the host vehicle. Therefore, after performing the method it is known for each cell of the dynamic grid whether the respective cell belongs to the collision free space or not. Hence, more useful information can be provided by the method for further applications of the host vehicle in comparison to providing e.g. a polygon in polar coordinates only which limits the collision free space. For example, such a grid-based representation of the collision free space can be used for determining a drivable surface in front of the host vehicle.

In addition, the dynamic grid is adapted to the course of the lane in front of the host vehicle. Therefore, such a dynamic grid comprises a reduced number of cells since the dynamic grid is automatically restricted to a so-called region of interest in front of the vehicle following the course of the lane. In summary, the computational effort for providing information regarding a collision free space in front of the vehicle for further applications is reduced due to the representation of the collision free space as a subset of cells within a dynamic grid. The information provided by the obstacle free subset of the cells may be used by further applications of the host vehicle in a straightforward manner. A specific adaptation, e.g. of a polygon representing the collision free space, is not required for the further applications.

The method may comprise one or more of the following features.

The host vehicle may comprise a vehicle coordinate system, and each of the plurality of limiting points may have a predefined angle with respect to the vehicle coordinate system, wherein the predefined angles may be different for each of the plurality of limiting points. A difference between the angles of neighboring limiting points may have a constant value for the plurality of limiting points.

A plurality of line segments may be defined for the plurality of limiting points. Each line segment of the plurality of line segments may start from an origin of the vehicle coordinate system and may end between two neighboring limiting points, wherein the obstacle free subset of the cells may be determined based on the plurality of line segments. Each line segment may have an angle with respect to the vehicle coordinate system which is between the predefined angles of the two corresponding neighboring limiting points.

The angle of a respective line segment may be the mean value of two angles of the corresponding neighboring limiting points. Each line segment may end at a distance with respect to the origin of the vehicle coordinate system which may be equal to the maximum distance of the two neighboring limiting points with respect to the host vehicle. A cell of the dynamic grid may belong to the obstacle free subset of cells if a line segment of the plurality of line segments traverses the cell entirely. A line segment of the plurality of line segments may traverse the cell entirely if the line segment intersects an outer contour of the cell at least twice.

Furthermore, forming the dynamic grid in front of the host vehicle may comprise i) detecting an indicator for the course of a lane in front of the host vehicle via the detection system of the host vehicle, ii) determining, via the computer system of the host vehicle, a base area based on the indicator for the course of a lane and iii) defining, via the computer system, the plurality of cells by dividing the base area in longitudinal and lateral directions with respect to the host vehicle.

A reference line may be defined via the computer system along the lane based on the indicator, and the reference line may be divided into segments, wherein for each of the segments a respective row of cells may be defined perpendicularly to the reference line. For each segment, two respective straight lines may be defined perpendicularly to the reference line at a beginning and at an end of the segment, respectively, and each straight line may be divided into a predefined number of sections, wherein end points of the respective sections may define corners of a respective one of the plurality of cells. In addition, a length and a width of every cell of the dynamic grid may be smaller than the minimum distance between all limiting cells of the plurality of limiting points.

According to an embodiment, the host vehicle may comprise a vehicle coordinate system, and each of the plurality of limiting points may have a predefined angle with respect to the vehicle coordinate system. The predefined angles may be different for each of the plurality of limiting points. Two limiting points may be regarded as neighboring limiting points if no predefined angle of any other limiting point is between the two predefined angles of the two limiting points under consideration.

In addition, a difference between these angles of neighboring limiting points may have a constant value for the plurality of limiting points. Since the predefined angles may be different for the limiting points, the region in front of the host vehicle can be covered properly for the determination of the collision free space. If a constant angle difference between neighboring limiting points is provided, the computational effort for processing the limiting points may be reduced.

According to a further embodiment, a plurality of line segments may be defined for the plurality of limiting points, and each line segment may start from an origin of the vehicle coordinate system and may end between two neighboring limiting points. The obstacle free subset of cells which defines the collision free space may be determined based on the plurality of line segments.

Since the line segments are each located between two neighboring limiting points, the plurality of line segments covers almost the same region in front of the host vehicle as a polygon defined by the plurality of the limiting points. Therefore, the line segments may be used in order to decide which cells of the dynamic grid belong to the obstacle free subset and therefore constitute the collision free space.

Each line segment may have an angle with respect to the vehicle coordinate system which is between the predefined angles of the two corresponding neighboring limiting points, respectively. In addition, the angle of the respective line segment may be the mean value of two angles of the corresponding neighboring limiting points. The definition of the angles of the line segments between neighboring limiting points ensures that each line segment extends within a proper area which is restricted by the limiting points. If the mean value of two angles of neighboring limiting points is used as the angle for the line segment, a straightforward definition for the direction of the line segments is achieved.

Furthermore, each line segment may end at a distance with respect to the origin of the vehicle coordinate system which may be equal to the maximum distance of the two neighboring limiting points with respect to the host vehicle. That is, the length of each line segment may be restricted to a region which can be regarded as obstacle free in front of the host vehicle. Hence, the safety for the host vehicle may be ensured.

A cell of the dynamic grid may belong to the obstacle free subset of cells if a line segment of the plurality of line segments traverses the cell entirely. In detail, a line segment of the plurality of line segments may traverse the cell entirely if the line segment intersects an outer contour of the cell at least twice.

In other words, a cell of the dynamic grid must be fully overlapped by at least one line segment in order to belong to the obstacle free subset of cells. If a line segment terminates within a specific cell, this cell does not belong to the obstacle free subset. Therefore, specific cells may belong to the obstacle free subset only if they are located within a polygon which may be defined by connecting pairs of limiting points including the origin of the vehicle coordinate system by straight lines. Due to this selection of the obstacle free subset of cells, the safety for the host vehicle may be improved. As a special case, a line segment may extend along a part of the outer contour of a cell. In this case, the line segment may be regarded as intersecting the contour of the cell at more than two points, and the cell under consideration belongs to the obstacle free subset. In summary, this selection of cells for the obstacle free subset is a straightforward means requiring a low computational effort.

According to a further embodiment, forming the dynamic grid in front of the host vehicle may comprise that an indicator for the course of a lane in front of the host vehicle may be detected via the detection system of the host vehicle, that a base area may be determined via the computer system of the host vehicle based on the indicator for the course of the lane, and that the plurality of cells may be defined via the computer system by dividing the base area in longitudinal and lateral directions with respect to the host vehicle. Since such a dynamic grid reflects the course of the lane, the number of cells of this grid is reduced due to the restriction of the grid to a region of interest in front of the host vehicle. Therefore, the computational effort for the method may be reduced again. The indicator for the course of the lane may include right and/or left margins of the lane and/or markers for the center of the lane.

A reference line may be defined via the computer system of the host vehicle along the lane based on the indicator, and the reference line may be divided into segments. For each of the segments, a respective row of cells may be defined perpendicularly to the reference line. Generating the dynamic grid may be facilitated by defining such rows of cells corresponding to the segments of the reference line.

In addition, for each segment two respective straight lines may be defined perpendicularly to the reference line at a beginning and at an end of the segment, respectively. Each straight line may be divided into a predefined number of sections, and end points of the respective sections may define corners of a respective one of the plurality of cells. Such a definition of the corners for the respective cells of the dynamic grid, i.e. by using the end points of the sections, may further facilitate the generation of the dynamic grid and may therefore reduce the required computational effort.

According to a further embodiment, a length and a width of every cell of the dynamic grid may be smaller than the minimum distance between all limiting points of the plurality of limiting points. That is, the dynamic grid may have a higher resolution than the plurality of limiting points. This may improve the accuracy when defining the collision free space in front of the host vehicle via the obstacle free subset of cells.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
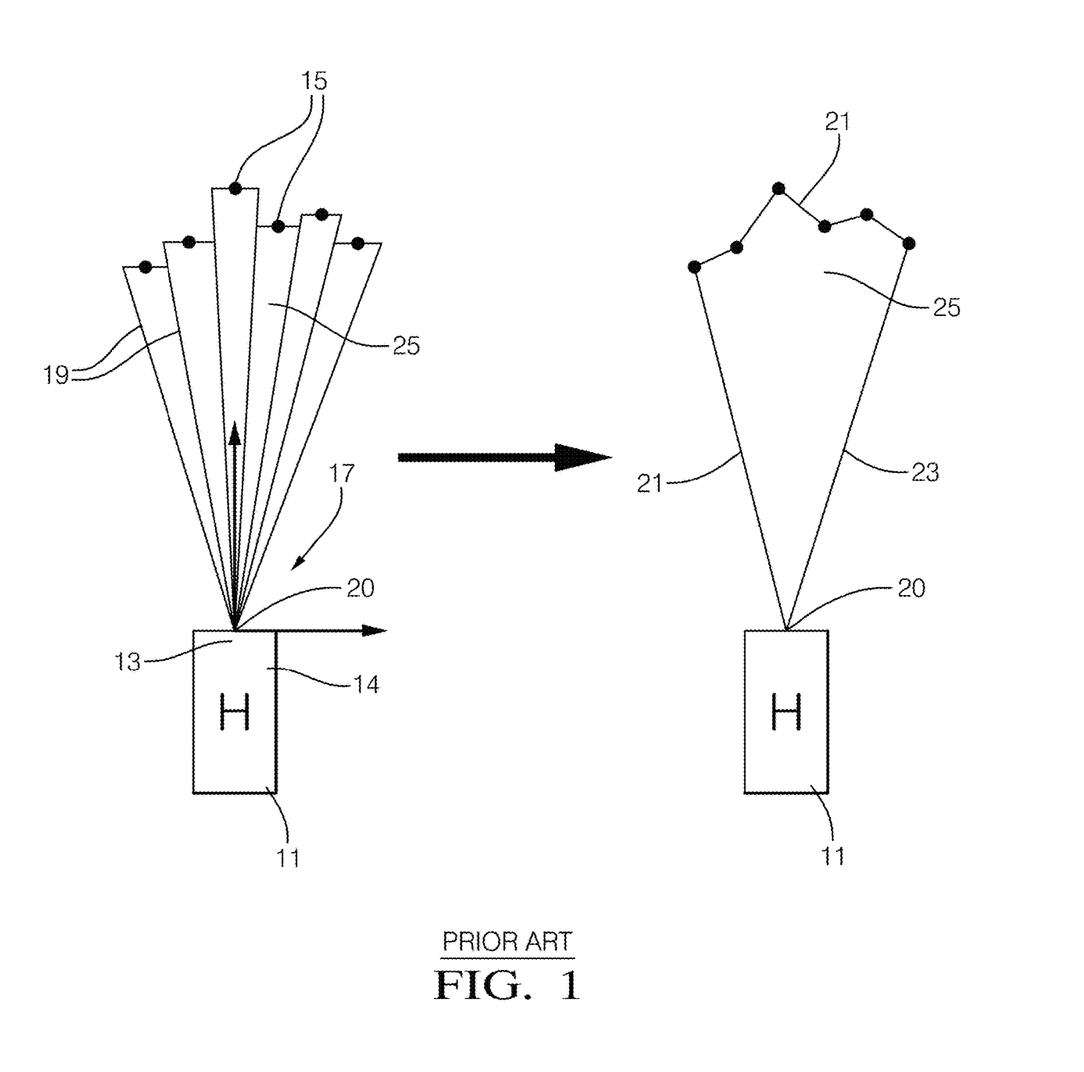
FIG. 1 depicts a determination of a collision free space in front of a host vehicle according to the background art.

FIG. 1 schematically depicts a host vehicle 11 including a detection system 13 which is configured for monitoring the environment of the host vehicle 11. The detection system 13 includes a visual system and/or a RADAR or LIDAR system. The host vehicle 11 further includes a computer system 14 for processing the data provided by the detection system 13.

The detection system 13 is configured for detecting a plurality of limiting points 15 in front of the host vehicle 11. Coordinates of the limiting points 15 are defined with respect to a vehicle coordinate system 17 as polar coordinates, i.e. including a range from an origin 20 of the vehicle coordinate system 17 and an angle with respect to one of the axes of the vehicle coordinate system 17. These polar coordinates represent the range and the angle for the next obstacles in front of the host vehicle 11. That is, a region in front of the host vehicle 11 which is restricted by the limiting points 15 is regarded as a collision free space 25.

As shown on the left side of FIG. 1, the collision free space 25 may be represented according to the background art via triangles, wherein each triangle comprises a basis extending through a respective limiting point 15, and two line segments 19 extending from the basis of the triangle to the origin 20 of the vehicle coordinate system 17. In the example as shown in FIG. 1, six limiting points 15 are shown defining six corresponding triangles for limiting the collision free space 25, wherein all triangles include the same angle between the respective line segments 19 ending at the origin 20 of the vehicle coordinate system 17.

As an alternative according to the background art, the collision free space in front of the host vehicle 11 may be represented by connecting the limiting points 15 via respective straight lines 21 in order to provide a polygon 23 extending through all limiting points 15 and through the origin 20 of the vehicle coordinate system 17. This is shown on the right side of FIG. 1. The collision free space 25 is represented by the interior of the polygon 23.

If the collision free space 25 is represented by triangles or the polygon 23 as shown in FIG. 1, information about the boundary of the collision free space 25 is available for the applications within the host vehicle 11 only. On the other hand, some applications of the host vehicle 11, e.g. applications for determining a drivable surface in front of the host vehicle, require a grid-based representation of the collision free space 25. Therefore, a transformation of the collision free space 25 as represented in FIG. 1 is usually required for each application separately in order to provide a grid-based representation of the collision free space 25. This increases the computational effort which is required for each of these applications.

Figure 2:
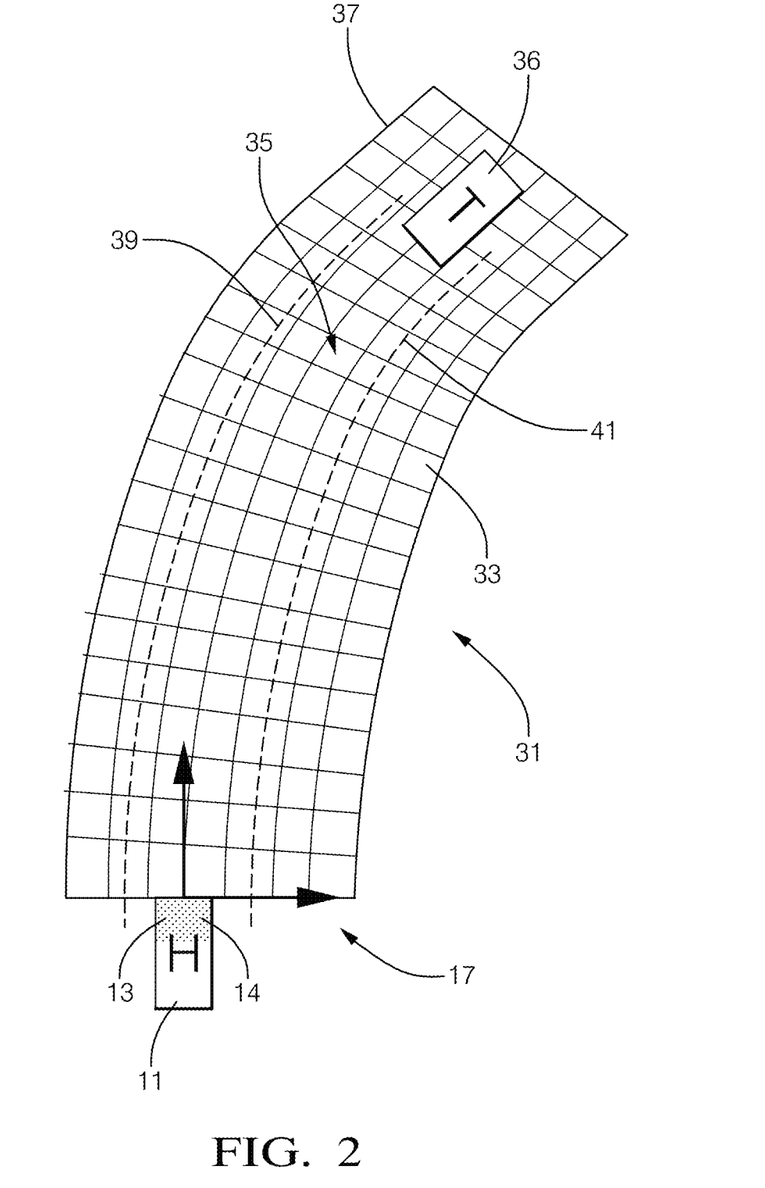
FIG. 2 depicts the definition of a dynamic grid in front of the host vehicle.
Figure 3:
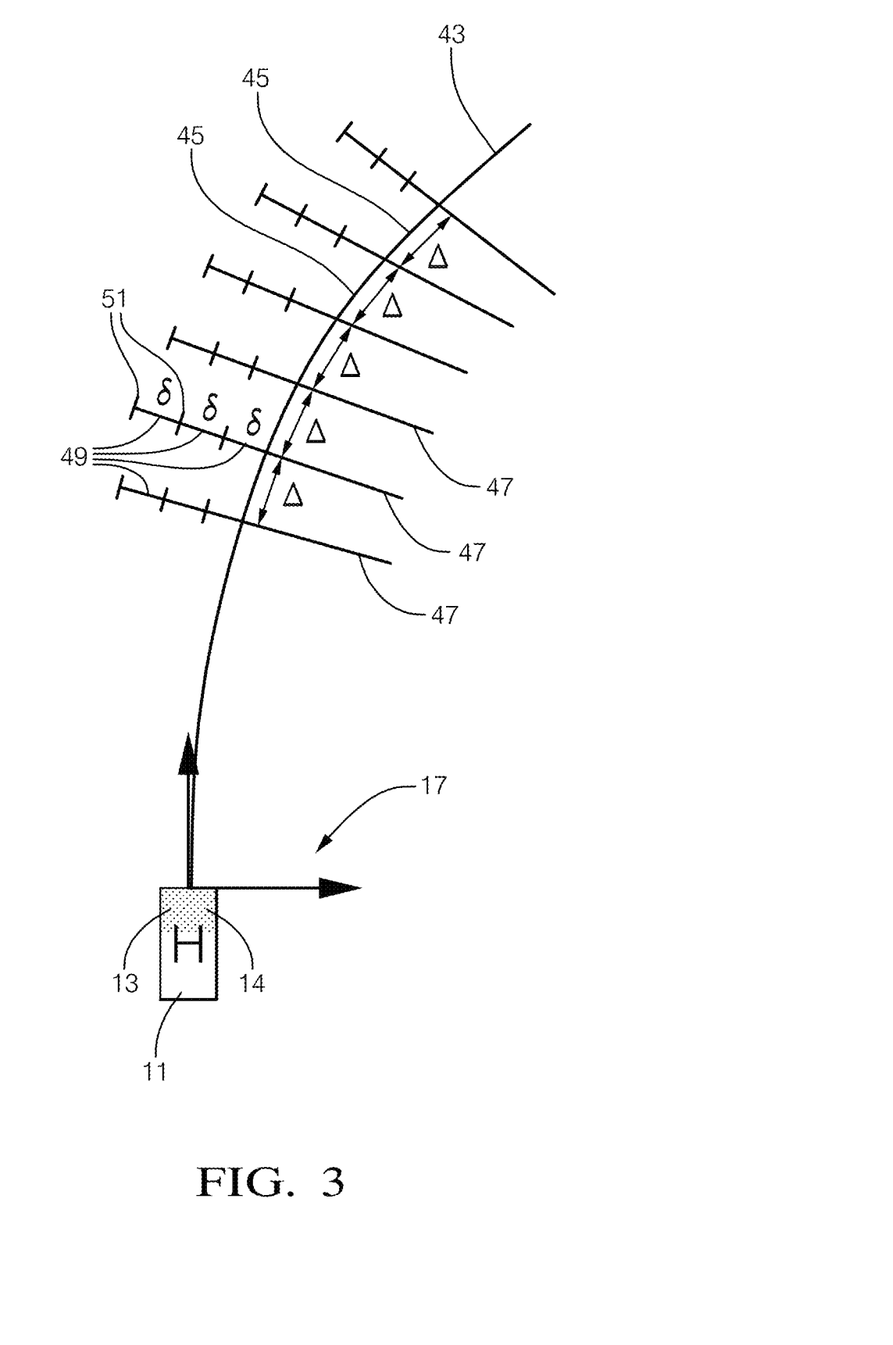
FIG. 3 depicts details for determining the dynamic grid as shown in FIG. 2.
Figure 4:
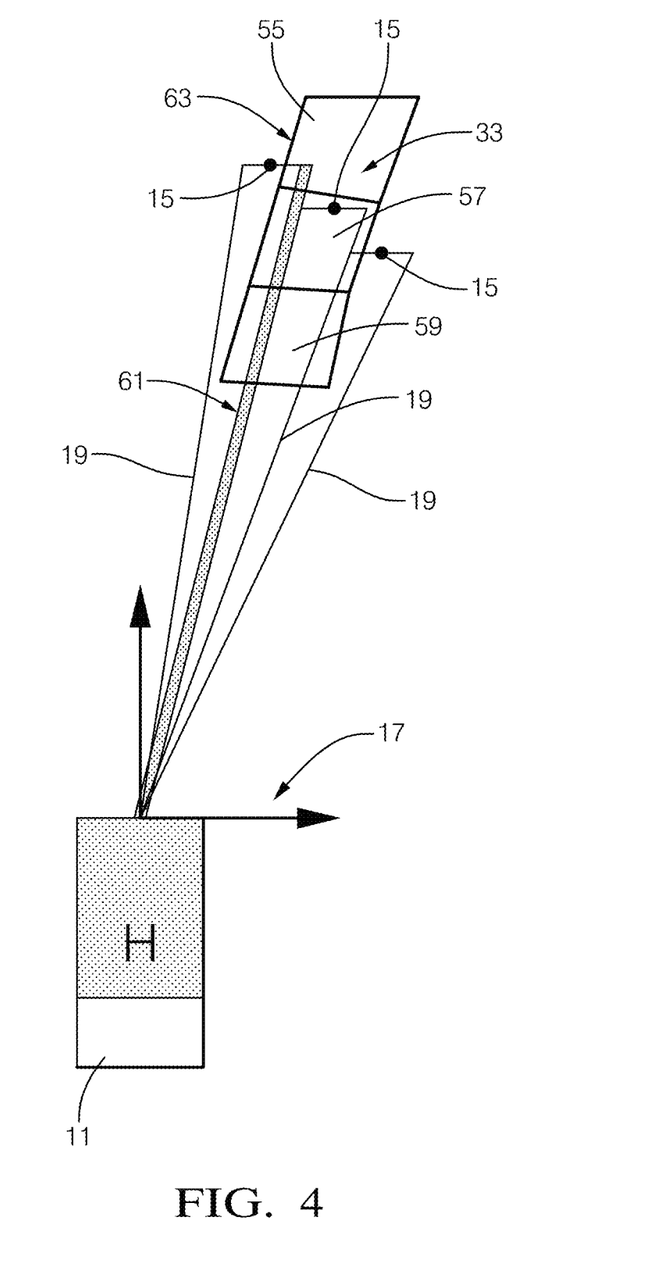
FIG. 4 depicts how an obstacle free subset of the dynamic grid is determined.
Figure 5:
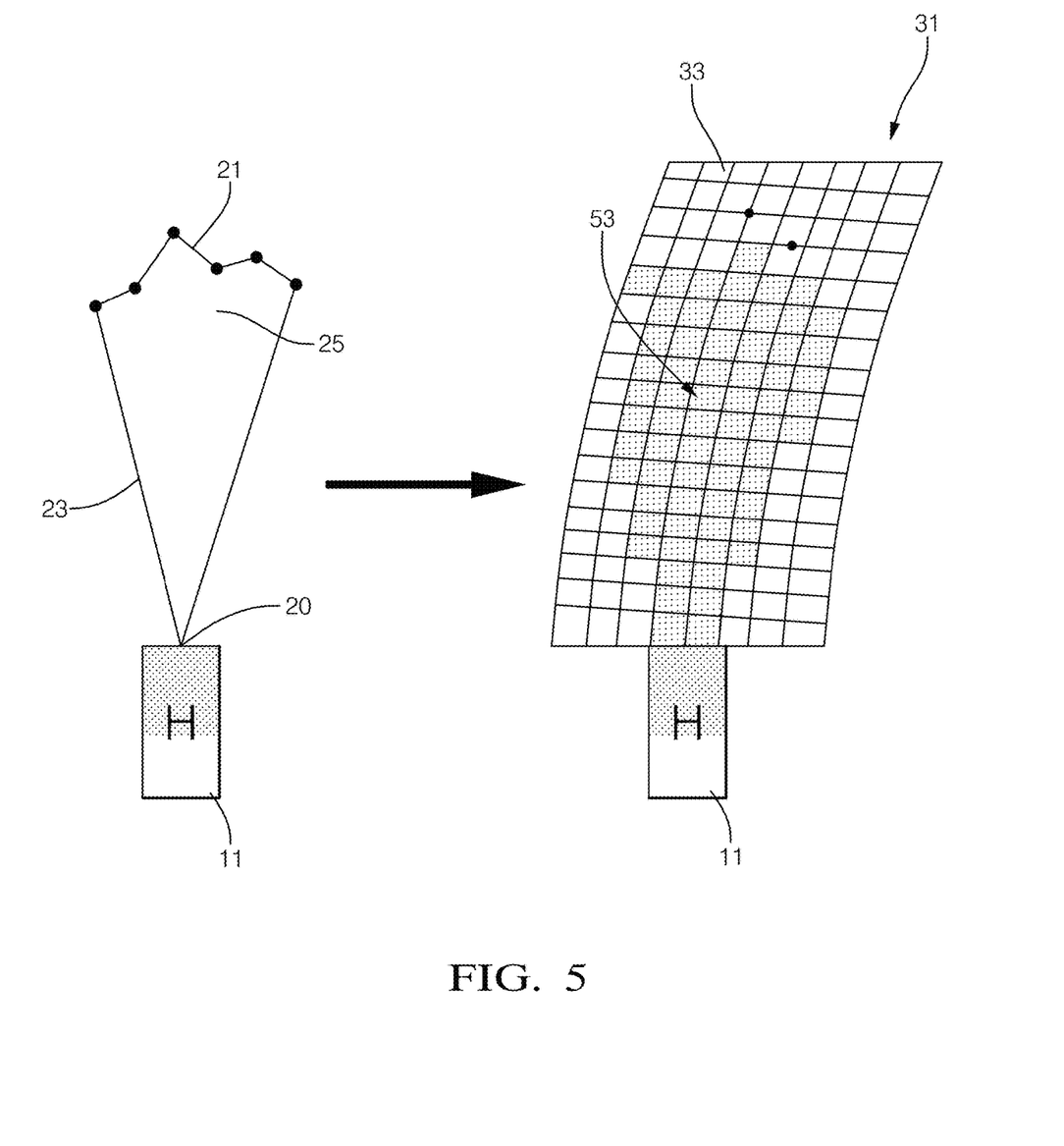
FIG. 5 depicts the collision free space represented within the dynamic grid in comparison to a representation according to the background art.

Therefore, the present disclosure provides a method for determining a grid-based representation for the collision free space 25 which may be provided for further applications. FIGS. 2 and 3 depict how a dynamic grid is to be constructed in front of the host vehicle 11, whereas FIGS. 4 and 5 depict details for determining the obstacle free space within such a dynamic grid.

FIG. 2 depicts a schematic representation of a dynamic grid 31. The dynamic grid 31 includes a plurality of dynamic cells 33 and is adapted to the course of a lane 35 in front of the host vehicle 11. In detail, the dynamic grid 31 is defined via the computer system 14 of the host vehicle 11 for a base area 37 which corresponds to a region of interest in front of the host vehicle 11. In order to define the base area 37, a left margin 39 and the right margin 41 of the lane 35 are detected by the detection system 13 of the host vehicle 11. Since the left margin 39 and the right margin 41 limit the lane 35, the left and right margins 39, 41 are used as indicators for the course of the lane 35 in front of the host vehicle 11.

As an example, for an obstacle limiting the free space in front of the host vehicle 11, the existence and the position of a target vehicle 36 are detected by the detection system 13 of the host vehicle 11. At least one of the limiting points 15 as shown in FIG. 1 is therefore located at the back of the target vehicle 36.

As mentioned above, the base area 37 for the dynamic grid 31 is intended to cover the region of interest for the host vehicle 11. For covering this region of interest properly, some areas beyond the left margin 39 and beyond the right margin 41 are included in the base area 37. That is, some parts of adjacent lanes, sidewalks and/or further environment like ditches may also be relevant for the further movement of the host vehicle 11 and have therefore to be included into the base area 37. The base area 37 is further divided in a plurality of dynamic cells 33 in order to generate the dynamic grid 31.

FIG. 3 depicts in detail how the dynamic cells 33 of the dynamic grid 31 are generated via the computer system 14 of the host vehicle 11. A reference line 43 is defined which extends approximately in the center of the lane 35 in which the host vehicle 11 and the target vehicle 36 are driving momentarily. The reference line 43 is represented by a polynomial whose coefficients are derived from an indicator for the course of the lane 35 which is measured by the detection system 13 of the host vehicle 11, e.g. by measuring the course of the left margin 39 and the right margin 41 of the lane 35 as indicators for the course of the lane 35.

The reference line 43 represented by the polynomial is divided into a plurality of segments 45 having a constant length A along the reference line 43. For each segment 45, two straight lines 47 are defined extending perpendicularly to the reference line 43, respectively. That is, adjacent segments 45 have a common straight line 47 which delimits respective areas from each other which extend on both sides of the reference line 43 between the straight lines 47. The straight lines 47 are further divided into sections 49 having a constant length δ. Therefore, end points 51 of the respective sections 49 also have a constant distance δ from each other.

The end points 51 of the sections 49 are used in order to define corner points for a respective dynamic cell 33 (see FIG. 2). In detail, two end points 51 of a section 49 being adjacent to each other and belonging to a first straight line 47 define two corner points of a dynamic cell 33, whereas two further end points 51 of a section 49 of the adjacent straight line 47 having the shortest distances to the first straight line 47 define two further corner points for the dynamic cell 33. That is, the four corner points of each dynamic cell 33 are defined by respective end points 51 of sections 49 belonging to adjacent straight lines 47 and having the shortest distance with respect to each other.

Due to the curvature of the reference line 43, the size of the dynamic cells 33 varies within the dynamic grid 31, as can be recognized in FIG. 2. In addition, the length of the segments 45 may be varied as an alternative along the reference line 41. For example, close to the host vehicle 11 a short length of the segments 43 may be used, whereas the length of the segments 45 may increase when their distance increases with respect to the host vehicle 11.

In the example as shown in FIG. 3, each segment 45 defines a row of dynamic cells 33, wherein this row extends perpendicularly to the reference line 43. If a predefined number of cells 33 is used for each row of cells 33 belonging to a certain segment 45, a constant lateral width of the dynamic grid 31 is defined corresponding to a constant lateral extension of the base area 37 corresponding to and covering the region of interest in front of the host vehicle 11.

Alternatively, the number of cells 33 for each row may be adjusted to the curvature of the lane 35 and the reference line 43. In detail, a greater number of cells 33 may be considered on a first side to which the reference line 43 is curved, e.g. on the right side as shown in FIGS. 2 and 3, whereas a smaller number of cells 33 is taken into account on the second side from which the reference line 43 departs. Such a situation is shown in FIG. 2 in which more cells 33 are present at the "inner side" of the lane 35 beyond the right margin 41, whereas less cells 33 are considered at the "outer side" of the left margin 39 of the lane 35.

FIG. 4 illustrates how it is determined whether a cell 33 of the dynamic grid 31 belongs to an obstacle free subset 53 (see FIG. 5) of the cells 33. In FIG. 4, the host vehicle 11 including the vehicle coordinate system 17 and three exemplary cells 55, 57, 59 are depicted which are a subset of the plurality of cells 33 forming the dynamic grid 31 (see FIG. 2). For each of the cells 55, 57, 59, a contour 63 is depicted which defines a boundary of the respective cell.

Three exemplary limiting points 15 and corresponding line segments 19 are also shown in FIG. 4. The plurality of limiting points 15 defines the collision free space 25 as described above (see FIG. 1).

Each of the limiting points 15 include a certain distance with respect to the origin 20 of the vehicle coordinate system 17 and a certain angle with respect to one of the axes of the vehicle coordinate system 17. Between two neighboring limiting points 15, an intermediate line segment 61 is defined. The intermediate line segment 61 starts at the origin 20 of the vehicle coordinate system 17 and ends between the neighboring limiting points 15 such that the length of the line segment 61 is equal to the maximum distance of the two neighboring limiting points 15 with respect to the host vehicle 11, i.e. to the origin 20 of the vehicle coordinate system 17.

As can be recognized in FIG. 4, the intermediate line segment 61 traverses the two lower cells 57, 59 entirely which have a shorter distance with respect to the host vehicle 11, whereas the intermediate line segment 61 terminates within the upper cell 55 having a larger distance with respect to the host vehicle 11 than the cells 57, 59. The area of the upper cell 55 is partly located beyond the limiting points 15, i.e. with respect to the host vehicle 11.

The obstacle free subset 53 (see FIG. 5) of the cells 33 is defined such that a cell 33 belongs to this subset 53 only if one of the intermediate line segments 61 traverses this cell 33 entirely, i.e. if the intermediate line segment 61 intersects the contour 63 of the respective cell 33 at least twice. In other words, the intermediate line segment 61 has to intersect two different boundary lines of the contour 63 of the cell 33. In this case, the cell 33 belongs to the obstacle free subset 53.

In the example as shown in FIG. 4, the two lower cells 57, 59 are traversed by the intermediate line segment 61 entirely and therefore belong to the obstacle free subset 53. In contrast, the upper cell 55 in which the intermediate line segment 61 terminates is not traversed by this line segment 61 entirely, and only one side of its contour 63 is intersected by the intermediate line segment 61. Therefore, the upper cell 55 does not belong to the obstacle free subset 53.

FIG. 5 depicts a comparison of the collision free space 25 as represented by a polygon 23 according to the background art (see also FIG. 1 on the right side) and the representation of the collision free space 25 as an obstacle free subset 53 within a dynamic grid 31. By performing the method according to the disclosure, the polar coordinates defined for the plurality of limiting points 15 are transferred to the cells 33 of the dynamic grid 31 in order to provide the obstacle free subset 53 of the cells 33 which is shown as a shaded area on the right side of FIG. 5.

By using the intermediate line segments 61 between each pair of neighboring limiting points 15 as described above in context of FIG. 4, it is decided for each cell 33 of the dynamic grid 31 whether the respective cell 33 belongs to the obstacle free subset 53 or not. Since the intermediate line segments 61 and the cells 33 of the dynamic grid 31 are independent from each other, the processing of the intermediate line segments 61 and of the corresponding cells 33 can be performed independently from each other. This reduces the computational time required for performing the method.

The representation of the collision free space 25 as the obstacle free subset 53 of the cells 33 can be used in different applications requiring grid based information, e.g. applications for determining a drivable surface in front of the host vehicle 11. Such grid based information cannot be provided in a straight forward manner by the representation of the collision free space 25 according to the background art since it is based on the polygon 23 connecting neighboring limiting points 15 as well as the origin 20 of the vehicle coordinate system 17 with straight lines.

What is claimed is:

1. A method, comprising:
    determining, by a computer system of a host vehicle, a collision free space in front of the host vehicle, the collision free space being relative a vehicle coordinate system, and determined by at least:
        detecting, via a detection system of the host vehicle, a plurality of limiting points each located at a respective obstacle free distance with respect to the vehicle, and each having a different predefined angle with respect to the vehicle coordinate system and each other of the limiting points;
        defining a plurality of line segments for each of the limiting points that starts from an origin of the vehicle coordinate system and ends between two neighboring limiting points to that limiting point;
        determining, via the detection system, a course of a lane determined to be in front of the host vehicle;
        forming a dynamic grid comprising a plurality of cells defined to be in front of the host vehicle based on the course of the lane; and
        determining, based on the line segments defined for the limiting points, an obstacle free subset of the cells to define the collision free space in front of the host vehicle; and
    controlling, by the computing system, the host vehicle to drive in the lane by proceeding forward within the collision free space on the course of the lane.
2. The method according to claim 1, wherein a difference between the angles of each pair of neighboring limiting points from the limiting points has a constant value.
3. The method according to claim 1, wherein each line segment has an angle with respect to the vehicle coordinate system, the angle being between the predefined angles of the two neighboring limiting points to the limiting point of that line segment.
4. The method according to claim 2, wherein the angle of a respective that line segment is the comprises a mean value of two corresponding angles of the two corresponding neighboring limiting points to that line segment.
5. The method according to claim 1, wherein each line segment ends at a distance with respect to an origin of the vehicle coordinate system that is equal to a maximum distance of the two neighboring limiting points with respect to the host vehicle.
6. The method according to claim 1, further comprising:
    assigning a cell of the dynamic grid to the obstacle free subset of cells if a line segment of the line segments entirely traverses that cell.
7. The method according to claim 6, wherein the line segment entirely traverses the cell if that line segment intersects, at least twice, with an outer contour of that cell.
8. The method according to claim 1, wherein forming the dynamic grid in front of the host vehicle comprises:
    detecting, via the detection system, an indicator for the course of the lane in front of the host vehicle;
    determining, via the computer system of the host vehicle, based on the indicator for the course of the lane, a base area; and
    defining, via the computer system, the plurality of cells by dividing the base area in longitudinal and lateral directions with respect to the host vehicle.
9. The method according to claim 8, further comprising:
    defining, via the computer system, based on the indicator, a reference line along the lane, the reference line being divided into segments each assigned a respective row of cells that is perpendicular to the reference line.
10. The method according to claim 9, further comprising:
    for each of the segments, defining two respective straight lines that are perpendicular to the reference line, respectively, at a beginning and at an end of the segment; and
    dividing each of the straight lines into a predefined number of sections each having end points that define corners of a one of the cells.
11. The method of claim 9, wherein the reference line comprises represented a polynomial with coefficients derived from the indicator.
12. The method of claim 11, further comprising deriving the coefficients from the indicator by:
    measuring a left margin of the course in the lane and a right margin of the course in the lane; and
    using the left margin and the right margin as the indicator for the course of the lane.
13. The method according to claim 1, wherein a length and a width of every cell of the dynamic grid are each smaller than a minimum distance between all of the limiting points.
14. The system of claim 1, wherein each line segment has an angle with respect to the vehicle coordinate system, the angle being between the predefined angles of the two neighboring limiting points to the limiting point of that line segment.
15. A system, comprising:
    a detection system configured to monitor an environment of a host vehicle;
    a computer system for the host vehicle, the computer system configured to determine a collision free space in front of the host vehicle using the detection system, the collision free space being relative a vehicle coordinate system, and determined by at least:
        detecting, via the detection system, a plurality of limiting points each located at a respective obstacle free distance with respect to the vehicle, and each having a different predefined angle with respect to the vehicle coordinate system and each other of the limiting points;

defining a plurality of line segments for each of the limiting points that starts from an origin of the vehicle coordinate system and ends between two neighboring limiting points to that limiting point;

determining, via the detection system, a course of a lane determined to be in front of the host vehicle;

forming a dynamic grid comprising a plurality of cells defined to be in front of the host vehicle based on the course of the lane; and determining based on the line segments defined for the limiting points, an obstacle free subset of the cells to define, the collision free space in front of the host vehicle; and controlling, by the computing system, the host vehicle to drive in the lane by proceeding forward on the course of the lane within the collision free space.

16. The system of claim 15, further comprising the host vehicle.

17. The system of claim 15, wherein a difference between the angles of each pair of neighboring limiting points from the limiting points has a constant value for the plurality of limiting points.

18. The system of claim 15, wherein the computer system comprises an advanced driver assistance system of the host vehicle.

19. The system of claim 15, wherein the detections system comprises a visual sensor system and at least one of a radar system or a lidar system.

20. A non-transitory computer readable medium comprising instructions that, when executed by at least one processor in communication with a detection system of a vehicle, configure the at least one processor to use the detection system to:

determine a collision free space in front of a host vehicle, the collision free space being relative a vehicle coordinate system and determined by at least:

detecting, via the detection system, a plurality of limiting points each located at a respective obstacle free distance with respect to the vehicle, and each having a different predefined angle with respect to the vehicle coordinate system and each other of the limiting points;

defining a plurality of line segments for each of the limiting points that starts from an origin of the vehicle coordinate system and ends between two neighboring limiting points to that limiting point;

determining, via the detection system, a course of a lane determined to be in front of the host vehicle;

forming a dynamic grid comprising a plurality of cells defined to be in front of the host vehicle based on the course of the lane; and determining based on the line segments defined for the limiting points, an obstacle free subset of the cells to define the collision free space in front of the host vehicle; and control the host vehicle to drive in the lane by proceeding forward on the course of the lane within the collision free space.

* * * * *